United States Patent [19]

Saito et al.

[11] Patent Number: 4,705,833

[45] Date of Patent: Nov. 10, 1987

[54] THERMOSETTABLE HEAT-RESISTANT RESIN COMPOSITIONS

[75] Inventors: Yasuhisa Saito, Osaka; Hisao Takagishi, Kyoto; Katsuya Watanabe, Osaka; Kohichi Okuno, Osaka; Junichi Kenmei, Hyogo; Kunimasa Kamio, Osaka, all of Japan

[73] Assignee: Sumitomo Chemical Company, Limited, Osaka, Japan

[21] Appl. No.: 813,272

[22] Filed: Dec. 24, 1985

[30] Foreign Application Priority Data

Jan. 17, 1985 [JP] Japan .................................. 60-7017
Mar. 23, 1985 [JP] Japan .................................. 60-58966

[51] Int. Cl.$^4$ ...................... C08G 59/44; C08G 59/54
[52] U.S. Cl. .................................... 525/504; 525/423; 528/99; 528/108; 528/109; 528/113; 528/117; 528/322
[58] Field of Search ............... 528/113, 117, 322, 363, 528/99, 108, 109; 525/423, 504

[56] References Cited

U.S. PATENT DOCUMENTS

| | | | |
|---|---|---|---|
| 3,346,665 | 10/1967 | Schwarzer | 528/117 X |
| 3,416,994 | 12/1968 | Chalmers et al. | 525/423 X |
| 3,639,657 | 2/1972 | Moran et al. | 528/113 X |
| 3,663,651 | 5/1972 | Traut | 525/423 X |
| 4,273,916 | 6/1981 | Jones | 528/117 |
| 4,277,583 | 7/1981 | Waitkus et al. | 525/423 |
| 4,340,715 | 7/1982 | Gounder et al. | 528/117 X |
| 4,366,302 | 12/1982 | Gounder et al. | 528/117 X |
| 4,410,664 | 10/1983 | Lee | 528/113 X |
| 4,487,894 | 12/1984 | Lee | 528/423 |

Primary Examiner—Earl Nielsen
Attorney, Agent, or Firm—Wenderoth, Lind & Ponack

[57] ABSTRACT

A thermosettable heat-resistant resin composition containing (A) an amino group-terminated imide compound produced by imidating an aromatic diamine with an aromatic tetracarboxylic anhydride at a diamine:anhydride molar ratio of from 1.2:1 to 4:1, and (B) an epoxy resin having at least two epoxy groups, the molar ratio of the amino group of the imide compound to the epoxy group of the epoxy resin being 1:1.6 to 1:2.6.

6 Claims, No Drawings

THERMOSETTABLE HEAT-RESISTANT RESIN COMPOSITIONS

The present invention relates to thermosettable heat-resistant resin compositions. More particularly, it relates to thermosettable heat-resistant resin compositions containing as essential components an epoxy resin and an imide compound or aromatic amide-imide compound having an amino group at its terminal.

Epoxy resins are superior in curability, adhesiveness, mechanical strength, chemical resistance, etc., and find wide applications in the fields of molding, laminating, adhesives, fiber-reinforced composite materials, etc. Epoxy resins, however, have a weak point that, because of their great thermal deformation at high temperatures, there is a limit to their heat resistance, and therefore they cannot be used for applications in which they are kept at high temperatures for a long time.

In order to improve the heat resistance of epoxy resins, there is an idea of introducing an imide group into the crosslinking unit. Since, however, aromatic compounds having an imide group generally have a high melting point and a poor compatibility with epoxy resins, it is very difficult to use these compounds and the resins in combination.

Low molecular weight imide compounds, for example, obtained from an aromatic diamine (e.g. 4,4'-diaminodiphenylmethane, 4,4'-diaminodiphenyl ether) and an acid anhydride (e.g. pyromellitic anhydride, 3,3',4,4'-benzophenonetetracarboxylic anhydride) have an amino or acid anhydride group at the terminal of the molecule, so that an idea exists of using them as a hardening agent for epoxy resins. But, the above low molecular weight imide compounds have too poor compatibility with epoxy resins to obtain cured products having good physical properties.

One method to improve such problems is to copolymerize an epoxy resin with an imide compound having an amino group at the terminal (an amino group-terminated imide compound), as described for example in U.S. Pat. No 4,277,583. In this patent, however, the range of molar ratio of amino group to epoxy group is very broad, i.e. at least 1 mole of epoxy group per mole of amine group. But, the structure of the copolymer largely changes with this molar ratio, i.e. when the molar ratio is 1:1, straight-chain copolymers are obtained as described in the 4th column of the patent; when the molar ratio is 1:2, the molecular chain of the copolymer grows three dimensionally to give insoluble infusible cured products; and when the molar ratio is for example 1:3, that is, the epoxy group is in large excess, if the amino group reacts 100%, only low molecular weight copolymers having an epoxy group at the terminal are obtained.

The structure of this copolymer, of course, largely affects the characteristics of the copolymer. For example, as shown by many examples in the specification of the foregoing U.S. Patent, when the amino:epoxy molar ratio is 1:1, the copolymers obtained have substantially no crosslinked structure so that their physical properties are not satisfactory enough to substitute for the conventional epoxy resins. In order to obtain a copolymer having sufficient solvent resistance, chemical resistance, mechanical strength and the like, it is desirable to make its structure three-dimensional by using a molar ratio of 1:2 or in its vicinity. But, there is a problem that such a composition causes a reduction in the compatibility between the imide compound and the epoxy resin.

With a focus on the imide compounds disclosed in the specification of the foregoing U.S. patent, the present inventors extensively studied to solve the above problems and find the composition of epoxy resin giving excellent curability, heat resistance, adhesiveness, mechanical properties and the like. As a result, the present inventors found that this object can be attained by the use of an amino group-terminated imide compound, one component of which, a diamine, is an aromatic diamine having a specified structure, and in which its molar ratio to the other component, an aromatic tetracarboxylic anhydride, is selected from a specified range.

As a result of a further study to search for imide compounds which have an imide structure in the molecule and excellent compatibility with epoxy resins, and also can easily react with epoxy groups to form a three-dimensional network structure, the present inventors found that the above object can be attained by the use of aromatic amide-imide compounds having both imide and amide groups in the molecule and also an amino group at the terminal of the molecule. The present inventors thus completed the present invention.

One object of the present invention is to provide a thermosettable heat-resistant resin composition (C) containing an amino group-terminated imide compound (A) produced by imidating at least one of the aromatic diamines represented by the general formulae (I), (II) and (III),

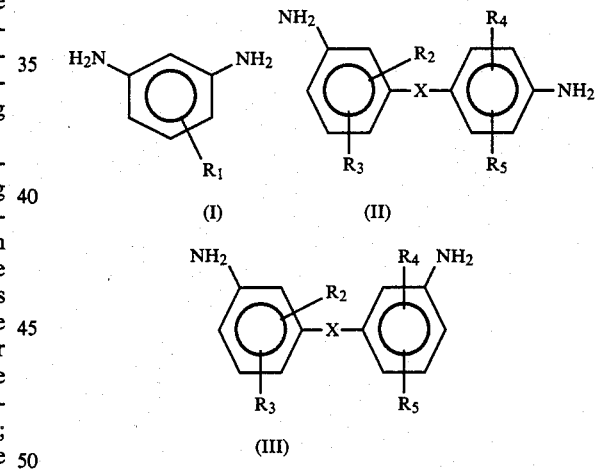

wherein $R_1$, $R_2$, $R_3$, $R_4$ and $R_5$ independently represent a hydrogen or halogen atom, or a $C_1$–$C_5$ alkyl, $C_1$–$C_3$ alkoxy or hydroxyl group, and X represents a divalent group selected from the group consisting of —$CH_2$—, —O—, —S—,

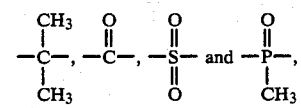

with an aromatic tetracarboxylic anhydride at a diamine:anhydride molar ratio of from 1.2:1 to 4:1, and an epoxy resin (B) having at least two epoxy groups in the molecule, the molar ratio of the amino group of the imide compound (A) to the epoxy group of the epoxy resin (B) being 1:1.6 to 1:2.6.

Another object of the present invention is to provide a thermosetting resin composition (F) containing as essential components an epoxy resin (D) having two or more β-unsubstituted glycidyl groups in the molecule and an aromatic amide-imide compound (E) having both an imide and amide groups in the molecule and also an amino group at the terminal of the molecule.

The cured product obtained, of course, has excellent heat resistance and high glass transition temperature and heat distortion temperature, and besides its adhesiveness, mechanical characteristics, solvent resistance, chemical resistance, etc. are also excellent. Also, the compositions of the present invention are superior in toughness, giving cured products having such ultimate elongation of about 2% or more as cannot be obtained from the conventional epoxy resin compositions.

As the aromatic diamines represented by the foregoing general formulae, (I), (II) and (III), used for producing the amino group-terminated imide compound (A), there are given for example m-phenylenediamine, 2,4-tolylenediamine, 2,6-tolylenediamine, 3,3'-diaminodiphenylmethane, 3,4'-diaminodiphenyl ether, 3,3'-diaminodiphenyl ether, 3,3'-diaminodiphenyl sulfone, 3,3'-diaminodiphenyl sulfide, 3,3'-diaminodiphenylpropane, 3,3'-diaminobenzophenone, 2,3-dimethyl-1,5-phenylenediamine, 2,4-diaminoanisole, 1-ethyl-2,4-phenylenediamine, 1-isopropyl-2,4-phenylenediamine, 4,4'-dihydroxy-3,3'-diaminodiphenyl sulfone, 4,4'-dichloro-3,3'-diaminodiphenylpropane, bis(3-aminophenyl)methylphosphonoxide and the like. These diamines may be used alone or in combination.

The aromatic tetracarboxylic anhydride is not particularly limited, and tetracarboxylic anhydrides, which are a material for the common polyimides, are used. These anhydrides include the dianhydrides of the following acids : Pyromellitic acid, 3,3', 4,4'-benzophenonetetracarboxylic acid, 2,3,6,7-naphthalenetetracarboxylic acid, 3,3', 4,4'-biphenyltetracarboxylic acid, 1,2,5,6-naphthalenetetracarboxylic acid, 2,2', 3,3'-biphenyltetracarboxylic acid, 3,4,9,10-pyrenetetracarboxylic acid, 2,2-bis(3,4-dicarboxyphenyl)-propane, 2,2-bis[4-(2,3-dicarboxyphenoxy)phenyl]propane, 2,2-bis[4-(3,4-dicarboxyphenoxy)phenyl]propane, bis(3,4-dicarboxyphenoxy)diphenyl sulfone, 1,4-bis(2,3-dicarboxyphenoxy)benzene and the like. These compounds may be used alone or in combination.

The amino group-terminated imide compounds (A) used in the present invention are obtained by dehydration/imidation of the foregoing aromatic diamines with aromatic tetracarboxylic dianhydrides.

As to the condition of the above dehydration/imidation, the molar ratio of the diamine to the tetracarboxylic anhydride is particularly important. When the molar ratio is less than 1.2:1, the imide compound obtained increases in the molecular weight, and its compatibility with epoxy resins decreases. Particularly, when the molar ratio of the amino group to the epoxy group is 1:2 or near thereto, the compatibility becomes poor and the concentration of the terminal amino group decreases, as a result of which sufficient properties as cured products cannot be obtained if hardening is carried out at such amino:epoxy molar ratio.

While, when the molar ratio of the diamine to the tetracarboxylic anhydride is more than 4:1, a lot of the diamine remains unreacted to cause a reduction in the imide concentration, so that the cured product obtained has no sufficient heat resistance.

Consequently, a range of from 1.2:1 to 4:1 is essential to the molar ratio of the diamine to the tetracarboxylic anhydride, and a more preferred range is 1.5:1 to 3:1.

That the amino group-terminated aromatic imide compounds (A) used in the present invention have excellent compatibility with and high reactivity with epoxy resins is due to that the amino groups of the aromatic diamine are located at the meta-position. When the amino groups are located at the para-position, the molecular symmetry of the imide compounds obtained is so great that a remarkable reduction in the compatibility with epoxy resins results. While, when the amino groups are ortho with respect to each other, reaction with epoxy resins is inhibited because of steric hindrance, so that sufficient properties as cured products cannot be obtained.

The epoxy resin (B) used in the present invention is a compound having at least two glycidyl groups in the molecule. Examples of the resin include, for example, glycidyl ether compounds derived from dihydric or trihydric phenols (e.g. bisphenol A, bisphenol F, hydroquinone, resorcinol, phloroglucinol) or halogenated bisphenols (e.g. tetrabromobispheno A); novolak type epoxy resins derived from novolak resins which are reaction products of phenols (e.g. phenol, o-cresol) with formaldehyde; amine type epoxy resins derived from aniline, p-aminophenol, m-aminophenol, 4,4'-diaminodiphenylmethane, p-phenylenediamine, m-phenylenediamine, p-xylyenediamine, m-xylyenediamine, 1,4-cyclohexane-bis(methylamine), 1,3-cyclohexane-bis(methylamine), etc.; glycidyl ester compounds derived from aromatic carboxylic acids (e.g. p-oxybenzoic acid, m-oxybenzoic acid, terephthalic acid, isophthalic acid); hydantoin type epoxy resins derived from 5,5-dimethylhydantoin, etc.; alicyclic epoxy resins such as 2,2'-bis(3,4-epoxycyclohexyl)propane, etc.; and other compounds such as triglycidyl isocyanurate, 2,4,6-triglycidoxy-S-trizine, etc. These epoxy resins may be used alone or in combination.

Of these epoxy resins, preferred ones are compounds having at least two β-unsubstituted glycidyl groups in the molecule, and particularly preferred compounds are liquid epoxy resins of a glycidyl ether type derived from bisphenol A, bisphenol F, resorcinol, etc.; of an amine type derived from 4-amino-m-cresol, p-aminophenol, m-aminophenol, 4,4'-diaminodiphenylmethane, m-xylylenediamine, 1,3-cyclohexane-bis(methylamine), etc.; and of a glycidyl ester type derived from oxybenzoic acid, etc.

In blending the amino group-terminated aromatic imide compound (A) with the epoxy resin (B), the molar ratio of amino group to epoxy group needs to be in a range of from 1:1.6 to 1:2.6. When the molar ratio is outside this range, the resin composition has sufficient chemical resistance, solvent resistance, adhesiveness, mechanical characteristics and the like. Said imide compound (A) exhibits easy compatibility with the resin (B) even in the above range of the molar ratio. A more preferred range of the amino: epoxy molar ratio is 1:1.8 to 1:2.4.

The amino group-terminated aromatic amide-imide compound (E), an essential component of the thermosetting resin composition (F), can be obtained by reacting an aromatic diamine with an aromatic polycarboxylic acid or its derivative. Specific examples of the amide-imide compound (E) include for example : (1) Amino group-terminated amide-imide compounds obtained by reacting an aromatic diamine with an aromatic compound having one carboxylic anhydride group and independently thereof, one carboxyl or haloformyl group; (2) ones obtained by reacting an aromatic diamine, an aromatic tetracarboxylic anhydride and an aromatic compound having two carboxyl or haloformyl groups in the molecule; and (3) ones obtained by reacting said materials used in (2) and said aromatic compound used in (1). In any of (1), (2) and (3), in order to provide the molecule of the amide-imide compound with a terminal amino group, the amidation/ imidation needs to be carried out using an excess, in equivalent ratio, of the aromatic diamine over the aromatic polycarboxylic acid or its derivative. The aforementioned amide-imide compounds (1), (2) and (3) can be represented as follows:

or haloformyl group includes for example trimellitic anhydride, trimellitic anhydride chloride, trimellitic anhydride bromide, etc.; the aromatic tetracarboxylic anhydride includes for example the dianhydrides of tetracarboxylic acids such as pyromellitic acid, 3,3',4,4'-benzophenonetetracarboxylic acid, 2,3,6,7-naphthalenetetracarboxylic acid, 3,3', 4,4'-biphenyltetracarboxylic acid, 1,2,5,6-naphthalenetetracarboxylic acid, 2,2', 3,3'-biphenyltetracarboxylic acid, 3,4,9,10-pyrenetetracarboxylic acid, 2,2-bis(3,4-dicarboxyphenyl)propane, 2,2-bis[4-(2,3-dicarboxyphenoxy)phenyl]propane, 2,2-bis[4-(3,4-dicarboxyphenoxy)phenyl]propane, bis(3,4-dicarboxyphenoxy)diphenyl sulfone, 1,4-bis(2,3-dicarboxyphenoxy)benzene, etc.; and the compound having two carboxyl or haloformyl

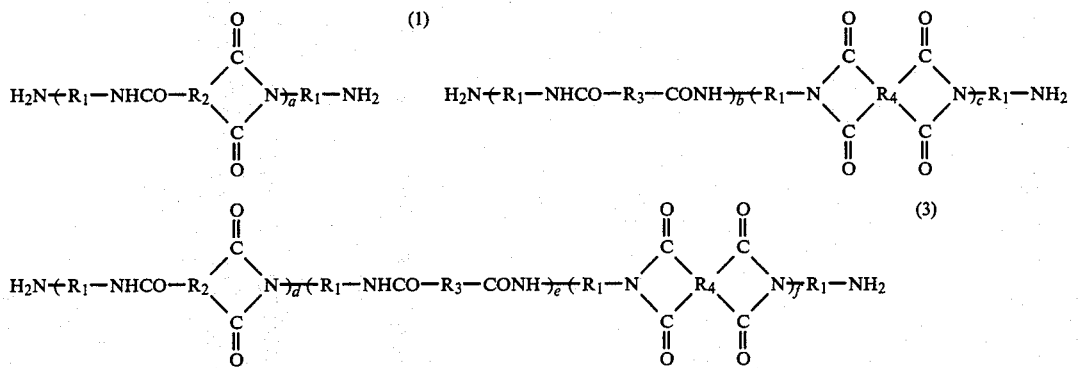

wherein $R_1$, $R_2$, $R_3$ and $R_4$ independently represent an aromatic residue, and a, b, c, d, e and f represent an integer. (2) or (3) represents a random copolymer.

Referring to the materials used for obtaining the amino group-terminated amide-imide compounds represented by (1), (2) and (3), the aromatic diamine includes for example : 4,4'-diaminodiphenylmethane, 3,3'-diaminodiphenylmethane, 4,4'-diaminodiphenyl ether, 3,4'-diaminodiphenyl ether, 4,4'-diaminodiphenylpropane, 4,4'-diaminodiphenyl sulfone, 3,3'-diaminodiphenyl sulfone, 2,4-tolylenediamine, 2,6-tolylenediamine, m-phenylenediamine, p-phenylenediamine, benzidine, 4,4'-diaminodiphenyl sulfide, 3,3'-dichloro-4,4'-diaminodiphenyl sulfone, 3,3'-dichloro-4,4'-diaminodiphenylpropane, 3,3'-dimethyl-4,4'-diaminodiphenylmethane, 3,3'-dimethoxy-4,4'-diaminobiphenyl, 3,3'-dimethyl-4,4'-diaminobiphenyl, 1,3-bis(4-aminophenoxy)benzene, 1,3-bis(aminophenoxy)benzene, 1,4-bis(4-aminophenoxy)benzene, 2,2-bis(4-aminophenoxyphenyl)propane, 4,4'-bis(4-aminophenoxy)diphenyl sulfone, 4,4'-bis(3-aminophenoxy)diphenyl sulfone, 9,9'-bis(4-aminophenyl)anthracene, 9,9'-bis(4-aminophenyl)fluorene, 3,3'-dicarboxy-4,4'-diaminodiphenylmethane, 2,4-diaminoanisole, 3,3'-diaminobenzophenone, o-toluidine sulfone, 5-amino-1-(4'-aminophenyl)-1,3,3-trimethylindane, 6-amino-1-(4'-aminophenyl)-1,3,3-trimethylindane, 5-amino-6-methyl-1-(3'-amino-4'-methylphenyl)-1,3,3-trimethylindane, 7-amino-6-methyl-1-(3'-amino-4'-methylphenyl)-1,3,3-trimethylindane, 6-amino-5-methyl-1-(4'-amino-3'-methylphenyl)-1,3,3-trimethylindane, 6-amino-7-methyl-1-(4'amino-3'-methylphenyl)-1,3,3-trimethylindane, bis(3-aminophenyl)methylphosphine oxide, etc. These compounds may be used alone or in combination. Particularly, the compounds represented by the general formulae (I), (II) and (III) are preferred.

The aromatic compound having one carboxylic anhydride group and independently thereof, one carboxyl groups in the molecule includes for example terephthalic acid chloride, terephthalic acid bromide, isophthalic acid chloride, isophthalic acid bromide, etc. These compounds may be used alone or in combination.

The epoxy resin (D), an essential component of the thermosetting resin composition (F), is a compound having at least two β-unsubstituted glycidyl groups in the molecule. Specific examples of the resin include, for example, glycidyl ether compounds derived from dihydric or more phenols [e.g. bisphenol A, bisphenol F, hydroquinone, resorcinol, phloroglucinol, tris-(4-hydroxyphenyl)methane, 1,1,2,2-tetrakis(4-hydroxyphenyl)ethane] or halogenated bisphenols (e.g. tetrabromobisphenol A); novolak type epoxy resins derived from novolak resins which are reaction products of phenols (e.g. phenol, o-cresol, m-cresol, p-cresol) with formaldehyde; amine type epoxy resins derived from amine compounds [e.g. aniline, p-aminophenol, m-aminophenol, 4,4'-diaminodiphenylmethane, 3,3'-diaminodiphenyl methane, 4,4'-diaminodiphenyl ether, 3,4'-diaminodiphenyl ether, 6-amino-m-cresol, 4-amino-m-cresol, p-phenylenediamine, m-phenylenediamine, 2,6-tolylenediamine, 2,4-tolylenediamine, p-xylylenediamine, m-xylylenediamine, 1,4-cyclohexanebis(methylamine), 1,3-cyclohexanebis(methylamine), 1,4-bis(4-aminophenoxy)benzene, 1,4-bis(3-aminophenoxy)benzene, 1,3-bis(4-aminophenoxy)benzene, 1,3-bis(3-aminophenoxy)benzene, 2,2-bis(4-aminophenoxyphenyl)propane]; glycidyl ester compounds derived from aromatic carboxylic acids (e.g. p-oxybenzoic acid, terephthalic acid, isophthalic acid); hydantoin type epoxy resins derived from 5,5-dimethylhydantoin, etc.; alicyclic epoxy resins such as 2,2-bis(3,4-epoxycyclohexyl)propane, 2,2-bis[4-(2,3-epoxypropyl)cyclohexyl]propane, vinylcyclohexene dioxide, 3,4-epoxycyclohexylmethyl-3,4-epoxycyclohexanecarboxylate, etc.; and other compounds such as triglycidyl isocyanulate, 2,4,6-triglycidoxy-S-triazine, etc. These epoxy resins may be used alone or in combination.

Of these epoxy resins (D), particularly preferred ones are liquid epoxy resins of a glycidyl ether type derived from bisphenol A, bisphenol F, resorcinol, etc.; an amine type derived from 4-amino-m-cresol, p-aminophenol, m-aminophenol, 4,4'-diaminodiphenylmethane, m-xylylenediamine, 1,3-cyclohexane-bis(methylamine), etc.; and a glycidyl ester type derived from oxybenzoic acid, etc.

In blending the amino group-terminated aromatic amide-imide compound (E) with the epoxy resin (D), it is preferred to select the molar ratio of amino group to glycidyl group from a range of from 1:1.4 to 1:3.0 in order to obtain excellent chemical resistance, solvent resistance, adhesiveness, mechanical characteristics and the like. A more preferred range is from 1:1.6 to 1:2.6. Said amide-imide compound exhibits good compatibility with the epoxy resin within the range described above.

The resin compositions (C) and (F) of the present invention may contain, if necessary, additives such as extenders, fillers, reinforcing agents, pigments and the like. These additives include, for example, silica, calcium carbonate, antimony trioxide, kaolin, titanium dioxide, zinc oxide, mica, barite, carbon black, polyethylene powder, polypropylene powder, aluminum powder, iron powder, copper powder, glass fiber, carbon fiber, alumina fiber, asbestos fiber, aramid fiber, etc. These additives may be used alone or in combination.

The resin compositions (C) and (F) of the present invention may be used together with the existing epoxy hardening agents, so far as the heat resistance is not damaged. These epoxy hardening agents include, for example, dicyandiamide; aromatic amines such as 4,4'-diaminodiphenyl sulfone, 3,3'-diaminodiphenyl sulfone, 4,4'-diaminodiphenylmethane, 4,4'-diaminodiphenyl ether, m-phenylenediamine, p-phenylenediamine, 4,4'-methylene-bis(o-chloroaniline), tetrachlorodiaminodiphenylmethane, 4,4'-diaminostilbene, 4,4'-diaminodiphenyl sulfide, m-xylylenediamine, p-xylylenediamine, etc.; phenol novolak resins; cresol novolak resins and the like. These epoxy hardening agents may be used alone or in combination.

Further, the well-known tertiary amines, phenol compounds, imidazoles, Lewis acids, etc. may be added as hardening accelerators if necessary.

The resin compositions of the present invention may be used in all of the fields wherein the existing epoxy resins are in practical use, for example in the fields of molding, laminating, adhesives, paints, fiber-reinforced composite materials and the like.

The resin compositions obtained by the present invention are characterized in that they have the same excellent curability, adhesiveness, solvent resistance, chemical resistance and the like as in the conventional epoxy resins, and besides their heat resistance, toughness and mechanical strength are superior to those of the conventional epoxy resins. The present invention will be illustrated specifically with reference to the following examples, but it is not limited to these examples. All parts in the examples are by weight.

SYNTHESIS OF AMINO GROUP-TERMINATED IMIDE COMPOUNDS

Synthesis example 1

To a 2-liter four-necked flask equipped with a thermometer, a condenser, a water distillate separating tube and a stirrer were added 85.5 g (0.7 mole) of 2,4-tolylenediamine and 257 g of m-cresol, and the mixture was heated to 50° C. At the same temperature, a slurry comprising 113 g (0.35 mole) of 3,3', 4,4'-benzophenonetetracarboxylic anhydride and 639 g of m-cresol was gradually added, and after addition, the same temperature was kept for 1 hour. Thereafter, 188 g of benzene was added, the reaction mixture was heated to the refluxing temperature, and reaction was continued while the water distillate was removed out of the flask and the benzene distillate was returned to the flask. After reaction, benzene and m-cresol were partly distilled off under reduced pressure, and methanol was added to the residual solution to deposit precipitates which were then washed and dried under reduced pressure to obtain a pale brown powder.

The amine equivalent of this product was 412 g/eq, and the imidation rate calculated from the acid value was 98.5%.

Synthesis example 2

To a 2-liter four-necked flask equipped with a thermometer, a condenser, a nitrogen inlet tube and a stirrer were added 298 g ( 1.2 moles) of 3,3'-diaminodiphenyl sulfone and 1474 g of m-cresol, and the mixture was heated to 140° C. Thereafter, 193 g (0.6 mole) of 3,3', 4,4'-benzophenonetetracarboxylic anhydride was added in portions over 30 minutes. The reaction mixture was heated to 150° C. and kept at the same temperature for 10 hours, during which water was distilled off by passing nitrogen at a rate of 20 liters/ hour. Thereafter, m-cresol was partly distilled off under reduced pressure, and the same procedure as in Synthesis example 1 was applied to obtain a pale yellow powder.

The amine equivalent of this product was 658 g/eq, and the imidation rate calculated from the acid value was 99.1%.

Synthesis example 3

The imide compound was synthesized in the same manner as in Synthesis example 2 except that the amounts of 3,3'-diaminodiphenyl sulfone and 3,3', 4,4'-benzophenonetetracarboxylic anhydride were changed to 223 g (0.9 mole) and 242 g (0.75 mole), respectively.

The amine equivalent of the product was 1930 g/eq, and the imidation rate calculated from the acid value was 98.2%.

Synthesis example 4

The imide compound was synthesized in the same manner as in Synthesis example 2 except that 3,3'-diaminodiphenyl sulfone was replaced by 4,4'-diaminodiphenyl sulfone.

The amine equivalent of the product was 663g/eq, and the imidation rate calculated from the acid value was 98.7%.

Synthesis example 5

The imide compound was synthesized in the same manner as in Synthesis example 2 except that the amounts of 3,3'-diaminodiphenyl sulfone and 3,3',4,4'- benzophenonetetracarboxylic anhydride were changed to 174 g (0.7 mole) and 203 g (0.63 mole), respectively.

The amine equivalent of the product was 2890 g/eq, and the imidation rate calculated from the acid value was 98.2%.

Example 1

A mixture of 100 parts of Sumi-epoxy ELM-434 (epoxy resin, a product of Sumitomo Chemical Co.), 172 parts of the imide compound obtained in Synthesis example 1 and 0.5 part of $BF_3$.monoethylamine were kneaded on a roll at 150° C. for 3 minutes, cooled and then crushed. The crushed product was press-molded at 200° C. for 30 minutes under a pressure of 100kg/cm$^2$ and then post-cured at 230° C. for 12 hours to obtain a test sample for evaluation.

Examples 2, 3 and 4

Test samples for evaluation were prepared in the same manner as in Example 1 using the imide compounds obtained in Synthesis examples 2 and 3, Sumi-epoxy ELM-434 and Sumi-epoxy ELA-128 (both are epoxy resins, products of Sumitomo Chemical Co.)

Sumi-epoxy ELM-434 is an epoxy resin composed mainly of

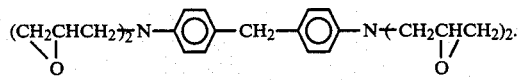

Sumi-epoxy ELA-128 is an epoxy resin composed mainly of

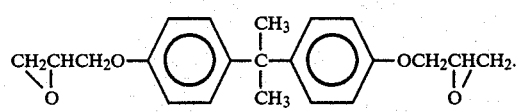

The result of evaluation of the cured products in Examples 1 to 4 is as shown in the following table.

Comparative example 1

Using Sumi-epoxy ELM-434 and the imide compound obtained in Synthesis example 4, roll-kneading was tried in the same manner as in Example 1, but the materials were not well mixed.

Comparative example 2

Using 100 parts of Sumi-epoxy ELM-434 and 1215 parts of the imide compound obtained in Synthesis example 5, roll-kneading was tried in the same manner as in Example 1, but the materials were not well mixed.

SYNTHESIS OF AMINO GROUP-TERMINATED AMIDE-IMIDE COMPOUNDS

Synthesis example 6

To a 2-liter four-necked flask equipped with a thermometer, a condenser and a stirrer were added 122 g (1.0 mole) of 2,4-tolylenediamine, 55.6 g (0.55 mole) of triethylamine and 800 g of dimethylacetamide, and the mixture was heated to 50° C. A previously prepared solution of 105 g (0.5 mole) of trimellitic anhydride chloride in 210 g of dimethylacetamide was added dropwise with the temperature kept at 50° C. Thereafter, the same temperature was kept for 3 hours, and the formed salt was removed by filtration. The filtrate was returned to the flask, heated to 170° C. while dimethylacetamide was partly distilled off, and kept at the same temperature for 6 hours. After reaction, a water/isopropanol mixed solution was added to deposit precipitates which were then washed and dried under reduced pressure to obtain a pale yellow powder.

The amine equivalent of this product was 301 g/eq, and the rate of residual carboxyl group calculated from the acid value was 0.4%.

Synthesis examples 7, 8 and 9

Synthesis was carried out in the same manner as in Synthesis example 6 except that materials and their amounts were changed as shown in the following table. The result of analysis of the products is also shown in the same table.

|  |  |  | (Unit of amount:part) | | | |
|---|---|---|---|---|---|---|
|  |  |  | Example 1 | Example 2 | Example 3 | Example 4 |
| Compounding | ELM-434 |  | 100 | 100 | — | — |
|  | ELA-128 |  | — | — | 100 | 100 |
|  | Imide | Synthesis example 1 | 172 | — | — | — |
|  |  | Synthesis example 2 | — | 274 | 173 | — |
|  |  | Synthesis example 3 | — | — | — | 509 |
|  | BF$_3$.monoethylamine |  | 0.5 | 0.5 | 0.5 | 0.5 |
| Physical | Tg* | (°C.) | 243 | 230 | 205 | 216 |
| properties | Tensile strength | (kg/mm$^2$) | 5.3 | 4.6 | 6.4 | 5.6 |
| of cured | Tensile modulus | (kg/mm$^2$) | 297 | 329 | 288 | 312 |
| product | Ultimate elongation | (%) | 2.3 | 1.6 | 3.1 | 2.2 |
|  | Bending strength | (kg/mm$^2$) | 11.6 | 11.3 | 13.6 | 10.8 |
|  | Flexural modulus | (kg/mm$^2$) | 498 | 583 | 500 | 566 |
|  | Flexure ratio** | (mm/mm) | 0.024 | 0.021 | 0.028 | 0.021 |

*Glass transition temperature by DMA measurement.
** $\frac{6 \times \text{(Thickness of test piece)} \times \text{(ultimate flexure at break)}}{\text{(distance between supporting points)}^2}$ the same table.

|  |  | Synthesis example 7 | Synthesis example 8 | Synthesis example 9 |
|---|---|---|---|---|
| Feed amount | 3,3-Diaminodiphenyl sulfone (g) | 149 (0.6 mole) | — | — |
|  | 4,4-Diaminodiphenyl-methane (g) | — | 149 (0.75 mole) | — |

-continued

|  |  | Synthesis example 7 | Synthesis example 8 | Synthesis example 9 |
|---|---|---|---|---|
|  | 2,4-Tolylenediamine (g) | — | — | 97.8 (0.8 mole) |
|  | Triethylamine (g) | 33.4 (0.33 mole) | 41.7 (0.41 mole) | 80.0 (0.792 mole) |
|  | Dimethylacetamide (g) | 816 | 600 | 640 |
|  | Trimellitic anhydride chloride (g) | 63.2 (0.3 mole) | 78.9 (0.375 mole) | 151.4 (0.72 mole) |
|  | Dimethylacetamide (g) | 126 | 158 | 302 |
| Analytical value | Amine equivalent (g/eq) | 494 | 578 | 1253 |
|  | Rate of residual carboxyl group (%) | 1.4 | 0.7 | 1.3 |

COMPARATIVE SYNTHESIS EXAMPLE (SYNTHESIS OF AMINO GROUP-TERMINATED IMIDE COMPOUND)

To a 2-liter four-necked flask equipped with a thermometer, a condenser, a nitrogen inlet tube and a stirrer were added 238 g ( 1.2 moles) of 4,4'-diaminodiphenylmethane and 1474 g of m-cresol, and the mixture was heated to 140° C. Thereafter, 193 g (0.6 mole) of 3,3',4,4'-benzophenonetetracarboxylic anhydride was added in portions over 30 minutes. The reaction mixture was heated to 150° C. and kept at the same temperature for 10 hours, during which water was distilled off by passing nitrogen at a rate of 20 liters/hour. Thereafter, m-cresol was partly distilled off under reduced pressure, and methanol was added to the residual solution to deposit precipitates which were then washed and dried under reduced pressure to obtain a pale yellow powder.

The amine equivalent of this product was 602 g/eq, and the rate of residual carboxyl group calculated from the acid value was 0.9%.

Examples 5, 6, 7, 8 and 9

Sumi-epoxy ELM-434, Sumi-epoxy ELA-128 (both are epoxy resins, products of Sumitomo Chemical Co.), the amide-imide compounds and BF$_3$. monoethylamine were blended in proportions shown in the following table, roll-kneaded at 150° C. for 3 minutes, cooled and then crushed. The crushed product was press-molded at 200° C. for 30 minutes under a pressure of 100kg/cm$^3$ and then post-cured at 230° C. for 12 hours to obtain a test sample for evaluation. The physical properties of the cured products obtained are also shown in the same table.

Comparative example 3

4,4'-Diaminodiphenyl sulfone was dissolved in Sumi-epoxy ELA-128 previously heated to 100° C. or more, and after adding BF$_3$. monoethylamine thereto, curing was carried out in the same condition as in the above Examples. The feed amounts of the materials and the physical properties of the cured product are also shown in the same table.

|  |  |  | Example 5 | Example 6 | Example 7 | Example 8 | Example 9 | Comparative example 3 |
|---|---|---|---|---|---|---|---|---|
| Compounding | ELM-434 |  | 100 | 100 | 100 | — | — | — |
|  | ELA-128 |  | — | — | — | 100 | 100 | 100 |
|  | Amide-imide compound | Synthesis example 6 | 126 | — | — | 80 | — | — |
|  |  | Synthesis example 7 | — | 206 | — | — | — | — |
|  |  | Synthesis example 8 | — | — | 240 | — | — | — |
|  |  | Synthesis example 9 | — | — | — | — | 335 | — |
|  | 4,4'-Diaminodiphenyl sulfone |  | — | — | — | — | — | 33 |
|  | BF$_3$.monoethylamine |  | 0.5 | 0.5 | 0.5 | 0.5 | 0.5 | 0.5 |
| Physical properties of cured product | Tg* | (°C.) | 261 | 242 | 251 | 224 | 234 | 167 |
|  | Tensile strength | (kg/mm$^2$) | 4.3 | 3.4 | 4.1 | 6.2 | 5.6 | 1.9 |
|  | Tensile modulus | (kg/mm$^2$) | 288 | 289 | 276 | 282 | 312 | 251 |
|  | Ultimate elongation | (%) | 2.4 | 1.9 | 2.1 | 3.1 | 3.5 | 0.7 |
|  | Bending strength | (kg/mm$^2$) | 10.0 | 7.2 | 10.8 | 12.9 | 10.6 | 5.3 |
|  | Flexural modulus | (kg/mm$^2$) | 534 | 550 | 444 | 500 | 562 | 327 |
|  | Flexure ratio** | (mm/mm) | 0.018 | 0.19 | 0.024 | 0.027 | 0.021 | 0.011 |

*Glass transition temperature by DMA measurement.

** $\frac{6 \times [(\text{Thickness of test piece}) \times (\text{ultimate flexure at break})]}{(\text{distance between supporting points})^2}$

Comparative example 4

Using Sumi-epoxy ELM-434 and the imide compound obtained in Comparative synthesis example, roll-kneading was tried in the same manner as in Example 5, but the materials were not well mixed.

What is claimed is:

1. A thermosettable heat-resistant resin composition containing an amino group-terminated imide compound (A) produced by imidating at least one of the aromatic diamines represented by the formulae (I), (II) and (III),

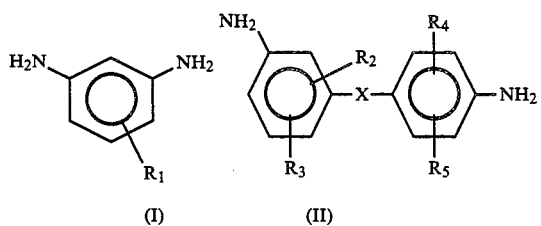

-continued

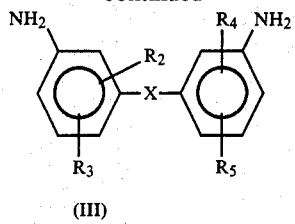

(III)

wherein $R_1$, $R_2$, $R_3$, $R_4$ and $R_5$ independently represent a hydrogen or halogen atom, or a $C_1$–$C_5$ alkyl, $C_1$–$C_3$ alkoxy or hydroxyl group, and X represents a divalent group selected from the group consisting of —$CH_2$—, —O—, —S—,

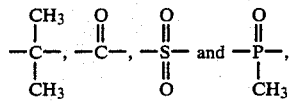

with an aromatic tetracarboxylic anhydride at a diamine:anhydride molar ratio of from 1.2:1 to 4:1, and an epoxy resin (B) having at least two epoxy groups in the molecule, the molar ratio of the amino group of the imide compound (A) to the epoxy group of the epoxy resin (B) being 1:1.6 to 1:2.6.

2. A thermosettable heat-resistant resin composition of claim 1, wherein the epoxy resin (B) is a compound having at least two β-unsubstituted glycidyl groups in the molecule.

3. A thermosettable heat-resistant resin composition of claim 2, wherein the epoxy resin (B) is selected from the group consisting of liquid epoxy resins derived from bisphenol A, bisphenol F and resorcinol, glycidyl esters, and glycidyl derivatives of amines.

4. A thermosetting resin composition containing as essential components an epoxy resin (D) having two or more β-unsubstituted glycidyl groups in the molecule, and an aromatic amide-imide compound (E) having both imide and amide groups in the molecule and an amino group at the terminal of the molecule.

5. A thermosetting resin composition of claim 4, wherein the epoxy resin (D) is selected from the group consisting of liquid epoxy resins derived from bisphenol A, bisphenol F and resorcinol, glycidyl esters, and glycidyl derivatives of amines.

6. A thermosetting resin composition of claim 4, wherein the aromatic amide-imide compound (E) is obtained by reacting at least one of the aromatic diamines represented by the formulae (I), (II) and (III),

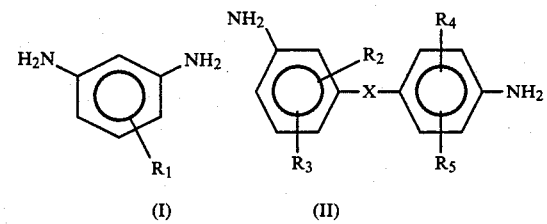

(I)  (II)

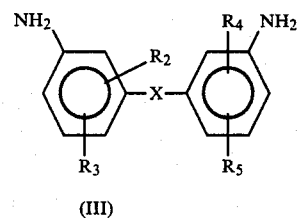

(III)

wherein $R_1$, $R_2$, $R_3$, $R_4$ and $R_5$ independently represent a hydrogen or halogen atom, or a $C_1$–$C_5$ alkyl, $C_1$–$C_3$ alkoxy or hydroxyl group, and X represents a divalent group selected from the group consisting of —$CH_2$—, —O—, —S—,

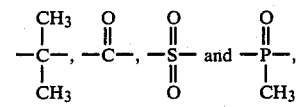

with an aromatic polycarboxylic acid or its derivative.

* * * * *